United States Patent
Fricke et al.

(10) Patent No.: US 11,078,320 B2
(45) Date of Patent: Aug. 3, 2021

(54) POROUS MATERIALS BASED ON AROMATIC AMINES

(75) Inventors: Marc Fricke, Osnabrueck (DE); Mark Elbing, Bremen (DE)

(73) Assignee: BASF SE, Ludwigshafen (DE)

( * ) Notice: Subject to any disclaimer, the term of this patent is extended or adjusted under 35 U.S.C. 154(b) by 407 days.

(21) Appl. No.: 13/515,139

(22) PCT Filed: Dec. 6, 2010

(86) PCT No.: PCT/EP2010/068962
§ 371 (c)(1),
(2), (4) Date: Jun. 11, 2012

(87) PCT Pub. No.: WO2011/069959
PCT Pub. Date: Jun. 16, 2011

(65) Prior Publication Data
US 2012/0305827 A1     Dec. 6, 2012

(30) Foreign Application Priority Data
Dec. 11, 2009 (EP) .................................... 09178783

(51) Int. Cl.
*C08G 18/32* (2006.01)
*C08J 9/28* (2006.01)
*C08G 101/00* (2006.01)

(52) U.S. Cl.
CPC .......... *C08G 18/3243* (2013.01); *C08J 9/286* (2013.01); *C08G 2110/0091* (2021.01); *C08G 2330/50* (2013.01); *C08J 2201/0502* (2013.01); *C08J 2375/02* (2013.01)

(58) Field of Classification Search
CPC .............. C08J 2205/028; C08G 18/32; C08G 18/3243; C08G 2101/0091; C08G 2220/00
See application file for complete search history.

(56) References Cited

U.S. PATENT DOCUMENTS

| | | | |
|---|---|---|---|
| 4,746,681 A * | 5/1988 | Pilger et al. | 521/51 |
| 4,808,636 A | 2/1989 | Saito et al. | |
| 5,478,867 A | 12/1995 | Tabor | |
| 5,622,777 A * | 4/1997 | Dempsey | 442/374 |
| 2010/0148109 A1 | 6/2010 | Schadler et al. | |
| 2012/0007012 A1 | 1/2012 | Fricke et al. | |
| 2012/0022179 A1 | 1/2012 | Emge et al. | |
| 2012/0111228 A1 | 5/2012 | Fricke et al. | |

FOREIGN PATENT DOCUMENTS

| | | |
|---|---|---|
| EP | 0 288 067 | 10/1988 |
| WO | 95 02009 | 1/1995 |
| WO | 2008 138978 | 11/2008 |
| WO | WO 2008138977 A1 * | 11/2008 |
| WO | 2009 027310 | 3/2009 |

OTHER PUBLICATIONS

Machine Translation of WO 2008/138977A1. Nov. 20, 2008.*
Partial Written Translation of WO2008/138977 A1. Nov. 20, 2008.*
U.S. Appl. No. 13/422,704, filed Mar. 16, 2012, Fricke, et al.
U.S. Appl. No. 13/403,530, filed Feb. 23, 2012, Fricke, et al.
U.S. Appl. No. 13/432,820, filed Mar. 28, 2012, Fricke, et al.
International Search Report dated Oct. 4, 2011 in PCT/EP10/68962 filed on Dec. 6, 2010.
U.S. Appl. No. 13/256,905, filed Sep. 15, 2011, US2012/0007012A1, Fricke, et al.
U.S. Appl. No. 13/143,144, filed Jul. 1, 2011, US2012/0022179A1, Emge, et al.
U.S. Appl. No. 13/381,231, filed Dec. 28, 2011, US2012/0111228A1, Fricke, et al.
U.S. Appl. No. 13/389,969, filed Feb. 10, 2012, Fricke, et al.
U.S. Appl. No. 13/500,664, filed Apr. 6, 2012, Prissok, et al.

* cited by examiner

*Primary Examiner* — Stephen E Rieth
(74) *Attorney, Agent, or Firm* — Grüneberg and Myers PLLC

(57) ABSTRACT

The invention relates to a porous material comprising at least one polyfunctional isocyanate (a1) and at least one polyfunctional substituted aromatic amine (a2-s) of the general formula (I):

$$Q^1\text{-}\underset{Q^4\ \ Q^5}{\overset{Q^2\ \ Q^3}{\underset{|}{\bigcirc}}}\text{-}\underset{R^2}{\overset{R^1}{\text{C}}}\text{-}\underset{Q^{5'}\ \ Q^{4'}}{\overset{Q^{3'}\ \ Q^{2'}}{\underset{|}{\bigcirc}}}\text{-}Q^{1'} \quad (\text{I})$$

where $R^1$ and $R^2$ are selected from among hydrogen and linear or branched alkyl groups having from 1 to 6 carbon atoms and all substituents $Q^1$ to $Q^5$ and $Q^{1'}$ to $Q^{5'}$ are selected from among hydrogen, a primary amino group and a linear or branched alkyl group having from 1 to 12 carbon atoms, where at least one of $Q^1$, $Q^3$ and $Q^5$ and at least one of $Q^{1'}$, $Q^{3'}$ and $Q^{5'}$ is a primary amino group and the compound has at least one linear or branched alkyl group having from 1 to 12 carbon atoms in the α position relative to at least one primary amino group bound to the aromatic ring in formula (I).

11 Claims, No Drawings

POROUS MATERIALS BASED ON AROMATIC AMINES

The invention relates to a porous material comprising the following components in reacted form:
(a1) an isocyanate component comprising at least one polyfunctional isocyanate and
(a2) an amine component comprising at least one polyfunctional substituted aromatic amine (a2-s) of the general formula I

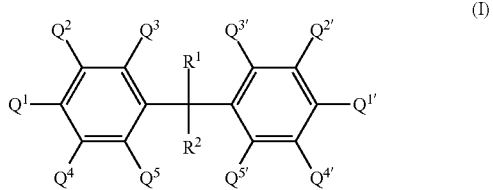
(I)

and optionally at least one further polyfunctional amine which is different from the amines (a2-s) of the general formula I and is selected from the group consisting of polyfunctional aliphatic amines (a2-a) and polyfunctional aromatic amines (a2-u),
where $R^1$ and $R^2$ can be identical or different and are selected independently from among hydrogen and linear or branched alkyl groups having from 1 to 6 carbon atoms and all substituents $Q^1$ to $Q^5$ and $Q^{1'}$ to $Q^{5'}$ can be identical or different and are selected independently from among hydrogen, a primary amino group and a linear or branched alkyl group having from 1 to 12 carbon atoms, where the alkyl group can bear further functional groups, with the proviso that
the compound of the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group and
$Q^2$, $Q^4$, $Q^{2'}$ and $Q^{4'}$ are selected so that the compound of the general formula I has at least one linear or branched alkyl group which can optionally bear further functional groups and has from 1 to 12 carbon atoms in the α position to at least one primary amino group bound to the aromatic ring.

The invention further relates to a process for producing porous materials, the porous materials which can be obtained in this way and the use of the porous materials as insulation materials and in vacuum insulation panels.

Porous materials, for example polymer foams, having pores in the size range of a few microns or significantly below and a high porosity of at least 70% are particularly good thermal insulators on the basis of theoretical considerations.

Such porous materials having a small average pore diameter can be present as, for example, organic xerogels. The term xerogel is not used uniformly throughout the literature. In general, a xerogel is understood to be a porous material which has been produced by a sol-gel process, with the liquid phase having been removed from the gel by drying below the critical temperature and below the critical pressure of the liquid phase ("subcritical conditions"). In contrast, gels are generally referred to as aerogels when the removal of the liquid phase from the gel has been carried out under supercritical conditions.

In the sol-gel process, a sol is firstly produced from a reactive organic gel precursor and the sol is then gelled by means of a crosslinking reaction to form a gel. To obtain a porous material, for example a xerogel, from the gel, the liquid has to be removed. This step will hereinafter be referred to as drying in the interests of simplicity.

WO-95/02009 discloses isocyanate-based xerogels which are particularly suitable for applications in the field of vacuum insulation. The publication additionally discloses a sol-gel-based process for producing the xerogels, in which known aromatic polyisocyanates, inter alia, and an unreactive solvent are used. As further compounds having active H atoms, aliphatic or aromatic polyamines or polyols are used. The examples disclosed in the publication comprise the ones in which a polyisocyanate is reacted with diaminodiethyltoluene. The xerogels disclosed generally have average pore sizes in the region of 50 μm. In one example, an average pore diameter of 10 μm is reported.

WO-2008/138978 discloses xerogels which comprise from 30 to 90% by weight of at least one polyfunctional isocyanate and from 10 to 70% by weight of at least one polyfunctional aromatic amine and whose volume-weighted average pore diameter is not more than 5 microns.

However, the materials properties, in particular the mechanical stability, of the known porous materials based on polyurea are not satisfactory for all applications. In addition, the formulations on which they are based display shrinkage with a reduction in the porosity and an increase in the density on drying.

A particular problem with the formulations based on isocyanates and amines which are known from the prior art is mixing defects. Mixing defects occur as a result of the high rate of reaction between isocyanates and amine groups since the gelling reaction has proceeded a long way before complete mixing. Mixing defects lead to porous materials having heterogeneous and unsatisfactory materials properties. A concept for reducing the phenomenon of mixing defects is therefore generally desirable.

It is therefore an object of the invention to avoid the abovementioned disadvantages. In particular, a porous material which does not have the abovementioned disadvantages or has them to a lesser extent should be provided. The porous materials should have, in comparison to the prior art, a reduced density at comparable porosity. Furthermore, the porous materials should also have a low thermal conductivity even at pressures above the vacuum range, in particular in a pressure range from about 1 mbar to about 100 mbar. This is desirable because a pressure increase occurs over time in vacuum panels. In addition, the porous material should simultaneously have a high porosity, a low density and a sufficiently high mechanical stability.

Finally, mixing defects and thus the heterogeneities in the material structure and the materials properties should be avoided in the porous materials formed in the reaction of the isocyanates with the amines.

We have accordingly found the porous materials of the invention and the process of the invention for producing porous materials.

Preferred embodiments may be found in the claims and the description. Combinations of preferred embodiments do not go outside the scope of the present invention.

Preferred constituents of the porous materials of the invention are described in more detail below.

The polyfunctional isocyanates (a1) will hereinafter be referred to collectively as component (a1). Correspondingly, the polyfunctional amines (a2) will hereinafter be referred to collectively as component (a2). It will be obvious to a person skilled in the art that the monomer components mentioned are present in reacted form in the porous material.

For the purposes of the present invention, the functionality of a compound is the number of reactive groups per molecule. In the case of monomer building blocks (a1), the functionality is the number of isocyanate groups per molecule. In the case of the amino groups of the monomer building blocks (a2), the functionality is the number of reactive amino groups per molecule. A polyfunctional compound has a functionality of at least 2.

If mixtures of compounds having different functionalities are used as component (a1) or (a2), the functionality of the components is in each case the number-weighted average of the functionality of the individual compounds. A polyfunctional compound comprises at least two of the abovementioned functional groups per molecule.

The porous materials of the invention preferably comprise from 20 to 80% by weight of component (a1) and from 20 to 80% by weight of component (a2), with the sum of the % by weight of the components (a1) and (a2) always being 100% by weight. The porous materials of the invention particularly preferably comprise from 25 to 75% by weight of component (a1) and from 25 to 75% by weight of component (a2), in particular from 35 to 65% by weight of component (a1) and from 35 to 65% by weight of component (a2).

Component (a1)

According to the invention, the porous material comprises at least one polyfunctional isocyanate in reacted form as component (a1).

Possible polyfunctional isocyanates are aromatic, aliphatic, cycloaliphatic and/or araliphatic isocyanates. Such polyfunctional isocyanates are known per se or can be prepared by methods known per se. The polyfunctional isocyanates can, in particular, also be used as mixtures, so that the component (a1) in this case comprises various polyfunctional isocyanates. Polyfunctional isocyanates which can be employed as monomer building blocks (a1) have two (hereinafter referred to as diisocyanates) or more than two isocyanate groups per molecule of the monomer component.

Particularly useful isocyanates are diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethylbiphenyl diisocyanate, 1,2-diphenylethane diisocyanate and/or p-phenylene diisocyanate (PPDI), trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and dicyclohexylmethane 4,4'-, 2,4'- and/or 2,2'-diisocyanate.

Aromatic isocyanates are preferred as polyfunctional isocyanates (a1). As polyfunctional isocyanates of the component (a1), particular preference is given to the following embodiments:

i) polyfunctional isocyanates based on tolylene diisocyanate (TDI), in particular 2,4-TDI or 2,6-TDI or mixtures of 2,4- and 2,6-TDI;

ii) polyfunctional isocyanates based on diphenylmethane diisocyanate (MDI), in particular 2,2'-MDI or 2,4'-MDI or 4,4'-MDI or oligomeric MDI, which is also referred to as polyphenylpolymethylene isocyanate, or mixtures of two or three of the abovementioned diphenylmethane diisocyanates or crude MDI which is obtained in the preparation of MDI, or mixtures of at least one oligomer of MDI and at least one of the abovementioned low molecular weight MDI derivatives;

iii) mixtures of at least one aromatic isocyanate according to embodiment i) and at least one aromatic isocyanate according to embodiment ii).

Particular preference is given to oligomeric diphenylmethane diisocyanate as polyfunctional isocyanate. Oligomeric diphenylmethane diisocyanate (hereinafter referred to as oligomeric MDI) is an oligomeric condensation product or a mixture of a plurality of oligomeric condensation products and thus derivatives of diphenylmethane diisocyanate (MDI). The polyfunctional isocyanates can preferably also be made up of mixtures of monomeric aromatic diisocyanates and oligomeric MDI.

Oligomeric MDI comprises one or more polycyclic condensation products of MDI having a functionality of more than 2, in particular 3 or 4 or 5. Oligomeric MDI is known and is frequently referred to as polyphenylpolymethylene isocyanate or else as polymeric MDI. Oligomeric MDI is usually made up of a mixture of MDI-based isocyanates having different functionalities. Oligomeric MDI is usually used in admixture with monomeric MDI.

The (average) functionality of an isocyanate comprising oligomeric MDI can vary in the range from about 2.2 to about 5, in particular from 2.4 to 3.5, in particular from 2.5 to 3. Such a mixture of MDI-based polyfunctional isocyanates having different functionalities is, in particular, crude MDI obtained in the preparation of MDI.

Polyfunctional isocyanates or mixtures of a plurality of polyfunctional isocyanates based on MDI are known and are marketed, for example, by Elastogran GmbH under the name Lupranat®.

The functionality of component (a1) is preferably at least two, in particular at least 2.2 and particularly preferably at least 2.5. The functionality of component (a1) is preferably from 2.2 to 4 and particularly preferably from 2.5 to 3.

The content of isocyanate groups of component (a1) is preferably from 5 to 10 mmol/g, in particular from 6 to 9 mmol/g, particularly preferably from 7 to 8.5 mmol/g. A person skilled in the art will know that the content of isocyanate groups in mmol/g and the equivalent weight in g/equivalent are inversely proportional. The content of isocyanate groups in mmol/g can be derived from the content in % by weight in accordance with ASTM D-5155-96 A.

In a preferred embodiment, the monomer component (a1) comprises at least one polyfunctional isocyanate selected from among diphenylmethane 4,4'-diisocyanate, diphenylmethane 2,4'-diisocyanate, diphenylmethane 2,2'-diisocyanate and oligomeric diphenylmethane diisocyanate. In this preferred embodiment, component (a1) particularly preferably comprises oligomeric diphenylmethane diisocyanate and has a functionality of at least 2.5.

Component (a2)

According to the invention, the porous materials comprise, as component (a2), at least one polyfunctional substituted aromatic amine (a2-s) of the general formula I

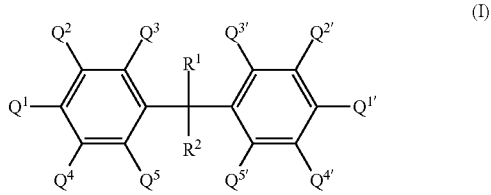
(I)

and optionally at least one further polyfunctional amine which is different from the amines (a2-s) of the general formula I and is selected from the group consisting of polyfunctional aliphatic amines (a2-a) and polyfunctional aromatic amines (a2-u), where $R^1$ and $R^2$ can be identical or different and are selected independently from among hydrogen and linear or branched alkyl groups having from 1 to 6 carbon atoms and all substituents $Q^1$ to $Q^5$ and $Q^{1'}$ to $Q^{5'}$ are identical or different and are selected independently from among hydrogen, a primary amino group and a linear or branched alkyl group having from 1 to 12 carbon atoms, where the alkyl group can bear further functional groups, with the proviso that the compound of the general formula I comprises at least two primary amino groups, where at least one of $Q^1$, $Q^3$ and $Q^5$ is a primary amino group and at least one of $Q^{1'}$, $Q^{3'}$ and $Q^{5'}$ is a primary amino group and $Q^2$, $Q^4$, $Q^{2'}$ and $Q^{4'}$ are selected so that the compound of the general formula I has at least one linear or branched alkyl group which can optionally bear further functional groups and has from 1 to 12 carbon atoms in the α position to at least one primary amino group bound to the aromatic ring.

Component (a2) thus comprises polyfunctional amines, with the polyfunctional aromatic amines (a2-s) of the general formula I being one constituent.

Polyfunctional amines are ones which have at least two amino groups which are reactive toward isocyanates per molecule. Amino groups which are reactive toward isocyanates are primary and secondary amino groups, with the reactivity of primary amino groups generally being significantly higher than that of secondary amino groups.

According to the invention, $R^1$ and $R^2$ in the general formula I are identical or different and are selected independently from among hydrogen, a primary amino group and a linear or branched alkyl group having from 1 to 6 carbon atoms. $R^1$ and $R^2$ are preferably selected from among hydrogen and methyl. Particular preference is given to $R^1=R^2=H$.

$Q^2$, $Q^4$, $Q^{2'}$ and $Q^{4'}$ are preferably selected so that the substituted aromatic amine (a2-s) comprises at least two primary amino groups which each have one or two linear or branched alkyl groups having from 1 to 12 carbon atoms in α position, where the alkyl groups can bear further functional groups. If one or more of $Q^2$, $Q^4$, $Q^{2'}$ and $Q^{4'}$ correspond to linear or branched alkyl groups which have from 1 to 12 carbon atoms and bear further functional groups, amino groups and/or hydroxy groups and/or halogen atoms are preferred as such functional groups.

The alkyl groups as substituents Q in the general formula I are preferably selected from among methyl, ethyl, n-propyl, isopropyl, n-butyl, sec-butyl and tert-butyl.

The amines (a2-s) are preferably selected from the group consisting of 3,3',5,5'-tetraalkyl-4,4'-diaminodiphenylmethane, 3,3',5,5'-tetraalkyl-2,2'-diaminodiphenylmethane and 3,3',5,5'-tetraalkyl-2,4'-diaminodiphenylmethane, where the alkyl groups in the 3,3',5 and 5' positions can be identical or different and are selected independently from among linear or branched alkyl groups which have from 1 to 12 carbon atoms and can bear further functional groups. Preference is given to the abovementioned alkyl groups methyl, ethyl, n-propyl, i-propyl, n-butyl, sec-butyl and t-butyl (in each case unsubstituted).

In one embodiment, one, more than one or all hydrogen atoms of one or more alkyl groups of the substituents Q can be replaced by halogen atoms, in particular chlorine. As an alternative, one, more than one or all hydrogen atoms of one or more alkyl groups of the substituents Q can be replaced by $NH_2$ or OH. However, preference is given to the alkyl groups in the general formula (I) being made up of carbon and hydrogen.

In a particularly preferred embodiment, component (a2) comprises 3,3',5,5'-tetraalkyl-4,4'-diaminodiphenylmethane, where the alkyl groups can be identical or different and are selected independently from among linear or branched alkyl groups which have from 1 to 12 carbon atoms and can optionally bear functional groups. Abovementioned alkyl groups are preferably selected from among unsubstituted alkyl groups, in particular methyl, ethyl, n-propyl, isopropyl, n-butyl, sec-butyl and tert-butyl, particularly preferably from among methyl and ethyl. Very particular preference is given to tetraethyl-4,4'-diaminodiphenylmethane.

The abovementioned polyfunctional amines of the type (a2-s) are known to those skilled in the art or can be prepared by known methods. One of the known methods is the reaction of aniline or derivatives of aniline with formaldehyde in the presence of an acid catalyst, in particular the reaction of 2,4- or 2,6-dialkylaniline.

The component (a2) can optionally also comprise further polyfunctional amines. Possible further polyfunctional amines are, in particular, polyfunctional aromatic amines (a2-u) which are different from the amines of the structure (a2-s) and also polyfunctional aliphatic amines (a2-a). Of course, amines which have both aliphatically and aromatically bound reactive amino groups are optionally also possible.

Suitable polyfunctional aromatic amines (a2-u) are, in particular, isomers and derivatives of diaminodiphenylmethane. Isomers and derivatives of diaminodiphenylmethane which are preferred for component (a2) are, in particular, 4,4'-diaminodiphenylmethane, 2,4'-diaminodiphenylmethane, 2,2'-diaminodiphenylmethane and oligomeric diaminodiphenylmethane.

Suitable polyfunctional aromatic amines (a2-u) are also, in particular, isomers and derivatives of toluenediamine. Isomers and derivatives of toluenediamine which are preferred for component (a2) are, in particular, toluene-2,4-diamine and/or toluene-2,6-diamine and diethyltoluenediamines, in particular 3,5-diethyltoluene-2,4-diamine and/or 3,5-diethyltoluene-2,6-diamine.

In a first preferred embodiment, component (a2) comprises exclusively polyfunctional aromatic amines of the type (a2-s). In a second embodiment, component (a2) comprises polyfunctional aromatic amines of types (a2-s) and (a2-u). In the latter, second preferred embodiment, component (a2) preferably comprises at least one polyfunctional aromatic amine (a2-u) of which at least one is selected from among isomers and derivatives of diaminodiphenylmethane (MDA).

In the second preferred embodiment, component (a2) particularly preferably comprises at least one polyfunctional aromatic amine (a2-u) selected from among 4,4'-diaminodiphenylmethane, 2,4'-diaminodiphenylmethane, 2,2'-diaminodiphenylmethane and oligomeric diaminodiphenylmethane.

Oligomeric diaminodiphenylmethane comprises one or more polycyclic methylene-bridged condensation products of aniline and formaldehyde. Oligomeric MDA comprises at least one oligomer, but generally a plurality of oligomers, of MDA having a functionality of more than 2, in particular 3 or 4 or 5. Oligomeric MDA is known or can be prepared by methods known per se. Oligomeric MDA is usually used in the form of mixtures with monomeric MDA.

The (average) functionality of a polyfunctional amine (a2-u) comprising oligomeric MDA can vary in the range from about 2.3 to about 5, in particular from 2.3 to 3.5 and in particular from 2.3 to 3. One such mixture of MDA-based polyfunctional amines having different functionalities is, in particular, crude MDA which is formed, in particular, in the condensation of aniline with formaldehyde, usually catalyzed by hydrochloric acid, as intermediate in the preparation of crude MDI.

In the second embodiment, particular preference is given to component (a2) comprising oligomeric diaminodiphenylmethane as compound (a2-u) and having an overall functionality of at least 2.1.

In a third preferred embodiment, which can be a modification of the first or second embodiment, polyfunctional aromatic amines (a2-a) can also be used as further constituent of component (a2), i.e. in addition to the amines of the first or second preferred embodiment.

In the third preferred embodiment, the polyfunctional aliphatic amines (a2-a) preferably comprise at least one primary amino group, in particular at least two primary amino groups. The suitable polyfunctional aliphatic amines can be used individually or in mixtures.

Appropriate polyfunctional aliphatic amines are known per se and are described in the international publication WO-2009/027310, page 7, line 28 to page 11, line 32, which is hereby expressly incorporated by reference.

Particularly preferred amines (a2-a) are polyalkylenepolyamines. For the purposes of the present invention, polyalkylenepolyamines are aliphatic amines which comprise at least 3 amino groups (primary, secondary or tertiary) and have a weight average molecular weight (Mw) of at least 500 g/mol. Suitable polyalkylenepolyamines are described in WO-2009/027310 on page 87, line 23 to page 11, line 23.

As polyalkylenepolyamines, particular preference is given in particular to polyethylenimines. For the purposes of the present invention, polyethylenimines encompass both oligomers and homopolymers and copolymers which comprise the group —$CH_2$—$CH_2$—NH— and comprise at least 3 amino groups and have a weight average molecular weight (Mw) of at least 500 g/mol. However, preferred polyethylenimines are ones which are made up essentially of ethylenimine, in particular homopolymers of ethylenimine.

The polyethylenimines which are particularly preferred as amines of the type (a2-a) are preferably made up of units selected from among terminal ethylenimine units of the structure —($CH_2$—$CH_2$—$NH_2$), linear ethylenimine units of the structure —($CH_2$—$CH_2$—NH)— and branched ethylenimine units of the structure N—($CH_2CH_2$—)$_3$.

The polyethylenimines are preferably used in water-free form, with the expression water-free meaning that the water content is from 0 to 1.5% by weight in accordance with DIN 53715 determined by the Karl Fischer method, preferably from 0 to 1% by weight, particularly preferably from 0 to 0.5% by weight.

The polyethylenimines are preferably highly branched. For the purposes of the present invention, highly branched polyethylenimines are uncrosslinked macromolecules which have —NH groups and are nonuniform in terms of their structure, in particular in respect of the length and order of the sections between branching points. They can be built up from a central molecule in a manner analogous to dendrimers but with a nonuniform chain length of the branches. However, they can also have a linear structure with functional side groups or else, as a combination of the two extremes, have linear and branched parts of the molecule.

The degree of branching (DB) is defined as DB=(T+Z)/(T+Z+L), where T is the number of terminal monomer units, Z is the number of branched monomer units and L is the number of linear monomer units, and is usually expressed in %. These numbers are determined by means of $^{13}$C-NMR spectra as primary (gives T), tertiary (gives Z) and secondary (gives L) amino groups. For the definition of the degree of branching, see also H. Frey et al., Acta Polym. 1997, 48, 30.

The degree of branching DB of the highly branched polyethylenimines which are particularly preferred in the third preferred embodiment is from 40 to 100%, preferably from 50 to 80% and in particular from 55 to 70%.

Suitable polyethylenimines are commercially available, for instance as Lupasol® from BASF.

Highly branched polyethylenimines having from 2 to 6, in particular 2 to 4, primary amino groups and a number average molecular weight of from 400 to about 10 000 g/mol, preferably from 800 to about 6000 g/mol, and having a degree of branching DB of from 40 to 100%, preferably from 50 to 80% and in particular from 55 to 70%, are particularly suitable as amine (a2-a).

The proportion of amines of the type (a2-s) of the general formula I in the total weight of all polyfunctional amines of component (a2), which thus add up to 100% by weight, is preferably from 1 to 100% by weight, in particular from 10 to 100% by weight, very particularly preferably from 30 to 100% by weight.

The proportion of polyfunctional aliphatic amines (a2-a) in the total weight of all polyfunctional amines of component (a2) is preferably from 0 to 90% by weight, in particular from 0 to 50% by weight, particularly preferably from 0 to 20% by weight.

The proportion of polyfunctional aromatic amines (a2-u) which are different from the amines of the type (a2-s) in the total weight of all polyfunctional amines of component (a2) is preferably from 0 to 90% by weight, in particular from 0 to 80% by weight, particularly preferably from 0 to 60% by weight.

The use of polyalkylenepolyamines as polyfunctional aliphatic amine (a2-a) leads, in combination with the amines (a2-s), to porous materials having a particularly high mechanical stability together with a high porosity, high pore volume and low density.

Accordingly, component (a2) comprises, in a particularly preferred embodiment, a total of from 50 to 99.5% by weight of polyfunctional aromatic amines (a2-s) of the general formula I and optionally aromatic amines (a2-u) which are different therefrom and also from 0.5 to 50% by weight of polyfunctional aliphatic amines (a2-a), with the sum of the % by weight of all polyfunctional amines being 100% by weight. In a very particularly preferred embodiment, component (a2) comprises from 80 to 99.5% by weight of polyfunctional aromatic amines (a2-s) of the general formula I and from 0.5 to 20% by weight of polyfunctional aliphatic amines (a2-a).

Process for Producing Porous Materials

A preferred process for producing the porous materials of the invention comprises the following steps:
(a) provision of the component (a1) and the component (a2) in a solvent (C);
(b) reaction of the components (a1) and (a2) in the presence of the solvent (C) to form a gel;
(c) drying of the gel obtained in the preceding step.

In step (a), the components (a1) and (a2) are preferably firstly provided separately from one another, in particular predissolved separately from one another in the solvent (C).

In a preferred embodiment, the component (a1) is provided in a first vessel and the constituents of component (a2) are provided in a second vessel, in each case in a solvent (C), and are finally combined at the beginning of step (b). A preferred process for producing the porous materials of the invention accordingly comprises the following steps:
(a-1) provision of the component (a1) and, separately therefrom, the component (a2), in each case in a solvent (C);
(a-2) provision of a gel precursor (A) comprising the components (a1) and (a2) in a solvent (C) by combining the components provided in step (a-1);
(b) reaction of the gel precursor (A) in the presence of the solvent (C) to form a gel;
(c) drying of the gel obtained in the preceding step.

Preferred embodiments of steps (a) to (c) are described in more detail below.

Step (a)

According to the invention, the provision of the component (a1) and the component (a2), in each case in a solvent (C), occurs in step (a). The gel precursor (A) is obtained by mixing the components (a1) and (a2). The gel precursor (A) thus comprises the monomer building blocks (a1) and (a2) described above in the proportions likewise described above.

The use ratio (equivalence ratio) of NCO groups of component (a1) to amino groups of component (a2) is preferably from 1.01:1 to 1.5:1. The equivalence ratio of NCO groups of component (a1) to amino groups of component (a2) is particularly preferably from 1.1:1 to 1.4:1, in particular from 1.1:1 to 1.3:1. An excess of NCO groups leads to lower shrinkage of the porous material, in particular xerogel, on removal of the solvent.

The monomer building blocks (a1) and (a2) are present in monomeric form in the gel precursor (A) or are converted beforehand by partial or nonequimolar reaction of isocyanate and amino groups into a prepolymer which, if appropriate with further monomer building blocks (a1) and (a2), forms the gel precursor (A). The gel precursor (A) is thus gellable, i.e. it can be converted by crosslinking in step (b) into a gel, viz. a crosslinked polymer. The proportions of the components (a1) and (a2) in the porous material in which they are present in polymeric form correspond to the proportions of the components (a1) and (a2) in the gel precursor (A) in which they are present in as yet unreacted form.

The viscosity of the component (a1) used can vary within a wide range. The component (a1) used in step (a) of the process of the invention preferably has a viscosity of from 100 to 3000 mPa·s, particularly preferably from 200 to 2500 mPa·s.

Thus, a mixture comprising the gel precursor (A) in a liquid diluent is provided in step (a) of the process of the invention. The term solvent (C) comprises, for the purposes of the present invention, liquid diluents, i.e. both solvents in the more narrow sense and also dispersion media. The mixture can, in particular, be a true solution, a colloidal solution or a dispersion, e.g. an emulsion or suspension. The mixture is preferably a true solution. The solvent (C) is a compound which is liquid under the conditions of step (a), preferably an organic solvent.

The solvent (C) can in principle be an organic compound or a mixture of a plurality of compounds and is liquid under the temperature and pressure conditions under which the mixture is provided in step (a) (dissolution conditions for short). The composition of the solvent (C) is selected so that it is able to dissolve or disperse, preferably dissolve, the organic gel precursor. Preferred solvents (C) are those which are a solvent for the organic gel precursor (A), i.e. those which completely dissolve the organic gel precursor (A) under reaction conditions.

The reaction product from step (b) is a gel, i.e. a viscoelastic chemical framework which has been swollen by the solvent (C). A solvent (C) which is a good swelling agent for the network formed in step (b) generally leads to a network having fine pores and a small average pore diameter, while a solvent (C) which is a poor swelling agent for the gel resulting from step (b) generally leads to a coarse-pored network having a large average pore diameter.

The choice of the solvent (C) thus influences the desired pore size distribution and the desired porosity. In addition, the solvent (C) is generally chosen so that precipitation or flocculation due to formation of a precipitated reaction product largely does not occur during or after step (b) of the process of the invention.

When a suitable solvent (C) is chosen, the proportion of precipitated reaction product is usually less than 1% by weight, based on the total weight of the mixture. The amount of precipitated product formed in a particular solvent (C) can be determined gravimetrically by filtering the reaction mixture through a suitable filter before the gelling point.

Possible solvents (C) are the solvents known from the prior art for isocyanate-based polymers. Preferred solvents are those which are a solvent for the components (a1) and (a2), i.e. those which dissolve the constituents of the components (a1) and (a2) virtually completely under reaction conditions so that the content of the organic gel precursor (A) in the total mixture provided in step (a) including the solvent (C) is preferably at least 5% by weight. The solvent (C) is preferably met, i.e. unreactive, toward component (a1).

Possible solvents (C) are, for example, ketones, aldehydes, alkyl alkanoates, amides such as formamide and N-methylpyrollidone, sulfoxides such as dimethyl sulfoxide, aliphatic and cycloaliphatic halogenated hydrocarbons, halogenated aromatic compounds and fluorine-comprising ethers. Mixtures of two or more of the abovementioned compounds are likewise possible.

Furthermore, acetals, in particular diethoxymethane, dimethoxymethane and 1,3-dioxolane, are possible as solvents (C).

Dialkyl ethers and cyclic ethers are likewise suitable as solvents (C). Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvents (C). Aldehydes or ketones suitable as solvents (C) are, in particular, those corresponding to the general formula $R^2$—(CO)—$R^1$, where $R^1$ and $R^2$ are each hydrogen or an alkyl group having 1, 2, 3 or 4 carbon atoms. Suitable aldehydes or ketones are, in particular, acetaldehyde, propionaldehyde, n-butyraldehyde, isobutyraldehyde, 2-ethyibutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, methyl isobutyl ketone, diethyl ketone, methyl ethyl ketone, methyl isobutyl ketone, methyl n-butyl ketone, ethyl isopropyl ketone, 2-acetylfuran, 2-methoxy-4-methyl-2-pentanone, cyclohexanone and acetophenone. The abovementioned aldehydes and ketones can also be used in the form of mixtures. Ketones and aldehydes having alkyl groups having up to 3 carbon atoms per substituent are preferred as solvents (C). Particular preference is given to acetone.

In many cases, particularly suitable solvents (C) are obtained by using two or more completely miscible compounds selected from the abovementioned solvents in the form of a mixture.

If a polyfunctional aliphatic amine (a2-a) is used as constituent of component (a2), it is advantageous to use the primary amino groups of the aliphatic amines in protected form at the beginning of step (b) so that the primary amino groups are essentially not present in free form as —$NH_2$. The protected primary amino groups of the aliphatic amines have a reduced reactivity toward isocyanates. The primary amino groups of the aliphatic amines are particularly preferably present in the form of a ketimine and/or an aldimine in step (b). Such aldimines and/or ketimines are preferably prepared by prior dissolution of the amine (a2-a) in one of the abovementioned aldehydes and/or ketones to form a corresponding aldimine and/or ketimine.

Appropriate methods are known per se to those skilled in the art and are described in WO-2009/027310 on page 12, line 24 to page 15, line 10 and on page 18, line 23 to page 19, line 13.

To obtain a sufficiently stable gel which does not shrink greatly during drying in step (c) from the reaction in step (b), the proportion of gel precursor (A) in the total mixture provided in step (a) of the process of the invention generally must be not less than 5% by weight. The proportion of the gel precursor (A) in the total mixture including the solvent (C) provided in step (a) of the process of the invention is preferably at least 6% by weight, particularly preferably at least 8% by weight, in particular at least 10% by weight.

On the other hand, the concentration of the gel precursor (A) in the mixture provided must not be too high since otherwise no porous material having advantageous properties is obtained. In general, the proportion of the gel precursor (A) in the total mixture provided in step (a) of the process of the invention is not more than 40% by weight. The proportion of the gel precursor (A) in the total mixture including the solvent (C) provided in step (a) of the process of the invention is preferably not more than 35% by weight, particularly preferably not more than 25% by weight, in particular not more than 20% by weight.

The mixture provided in step (a) can additionally comprise customary auxiliaries known to those skilled in the art as further constituents. Mention may be made of, for example, surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials and biocides.

Further details regarding the abovementioned auxiliaries and additives may be found in the specialist literature, e.g. Plastics Additive Handbook, 5th edition, H. Zweifel, ed. Hanser Publishers, Munich, 2001.

The provision of the mixture in step (a) of the process of the invention can be carried out in a customary way. Preference is given to using a stirrer or another mixing apparatus for this purpose in order to achieve good mixing. The other mixing conditions are generally not critical; for example, mixing can be carried out from 0 to 100° C. and from 0.1 to 10 bar (absolute), in particular, for example, at room temperature and atmospheric pressure.

The mixture provided in step (a) can also be referred to as a sol. For the purposes of the present invention, the term sol refers to both a colloidal solution in which the organic gel precursor (A) is dispersed in very finely divided form in a solvent as dispersion medium or to a true solution of the organic gel precursor (A) in a solvent.

Step (b)

According to the invention, the reaction of the components (a1) and (a2) in the presence of the solvent (C) to form a gel takes place in step (b). Thus, the organic gel precursor (A) is converted in a gelling reaction into a gel in step (b) of the process of the invention. The gelling reaction is a polyaddition reaction, in particular a polyaddition of isocyanate groups and amino groups.

For the purposes of the present invention, a gel is a crosslinked system based on a polymer which is present in contact with a liquid (known as Solvogel or Lyogel, or in the case of water as liquid: Aquagel or Hydrogel). The polymer phase here forms a continuous three-dimensional framework.

In step (b) of the process of the invention, the gel is usually formed by allowing to rest, e.g. by simply allowing the container, reaction vessel or reactor in which the mixture is present (hereinafter referred to as gelling apparatus) to stand. During gelling (gel formation), the mixture is preferably not stirred or mixed because this could hinder the formation of the gel. It has been found to be advantageous to cover the mixture during gelling or to close the gelling apparatus.

Gelling is known per se to those skilled in the art and is described, for example, in WO-2009/027310 on page 21, line 19 to page 23, line 13.

Step (c)

According to the invention, the gel obtained in the previous step is dried in step (c).

In principle, drying under supercritical conditions is possible, preferably after replacement of the solvent by $CO_2$ or other solvents suitable for the purposes of supercritical drying. Such drying is known per se to those skilled in the art. Supercritical conditions refer to a temperature and a pressure at which the liquid phase to be removed is present in the supercritical state. This enables shrinkage of the gel body on removal of the solvent to be minimized.

However, in view of the simplicity of the process, preference is given to drying the resulting gels by converting the liquid comprised in the gel into the gaseous state at a temperature and a pressure below the critical temperature and the critical pressure of the liquid comprised in the gel.

Drying of the gel obtained is preferably carried out by converting the solvent (C) into the gaseous state at a temperature and a pressure below the critical temperature and the critical pressure of the solvent (C). Accordingly, drying is preferably carried out by removing the solvent (C) which was present in the reaction without prior replacement by a further solvent.

Appropriate methods are likewise known to those skilled in the art and are described in WO-2009/027310 on page 26, line 22 to page 28, line 36.

Properties of the Porous Materials and Use

Xerogels are preferred as porous materials for the purposes of the present invention, i.e. the porous material of the invention is preferably a xerogel.

For the purposes of the present invention, a xerogel is a porous material which has a porosity of at least 70% by volume and a volume average pore diameter of not more than 50 microns and has been produced by a sol-gel process, with the liquid phase having been removed from the gel by drying below the critical temperature and below the critical pressure of the liquid phase ("subcritical conditions").

The average pore diameter is determined by means of mercury intrusion measurement in accordance with DIN 66133 and, for the purposes of the present invention, is basically a volume-weighted average. The mercury intrusion measurement in accordance with DIN 66133 is a porosimetric method and is carried out in a porosimeter. Here, mercury is pressed into a sample of the porous material. Small pores require a higher pressure in order to be filled with the mercury than large pores, and a pore size distribution and the volume-weighted average pore diameter can be determined from the corresponding pressure/volume graph.

The volume-weighted average pore diameter of the porous material is preferably not more than 5 microns. The volume-weighted average pore diameter of the porous material is particularly preferably not more than 4 microns, very particularly preferably not more than 3 microns and in particular not more than 2.5 microns.

Although a very low pore size at high porosity is desirable from the point of view of a low thermal conductivity, there is a practical lower limit to the volume-weighted average pore diameter as a result of the method of production and in order to obtain a sufficiently mechanically stable porous material. In general, the volume-weighted average pore diameter is at least 200 nm, preferably at least 400 nm. In many cases, the volume-weighted average pore diameter is at least 500 nm, in particular at least 1 micron.

The porous material of the invention preferably has a porosity of at least 70% by volume, in particular from 70 to 99% by volume, particularly preferably at least 80% by volume, very particularly preferably at least 85% by volume, in particular from 85 to 95% by volume. The porosity in % by volume means that the indicated proportion of the total volume of the porous material consists of pores. Although a very high porosity is usually desirable from the point of view of a minimal thermal conductivity, an upper limit is imposed on the porosity by the mechanical properties and the processability of the porous material.

According to the invention, the components (a1) and (a2) are present in reacted (polymeric) form in the porous material. Owing to the composition according to the invention, the monomer building blocks (a1) and (a2) are predominantly bonded via urea linkages in the porous material. A further possible type of linkage in the porous material is isocyanurate linkages formed by trimerization of isocyanate groups of the monomer building blocks (a1). If the porous material comprises further components, further linkages, for example urethane groups formed by reaction of isocyanate groups with alcohols or phenols, are possible.

Preference is given to at least 50 mol % of the components (a1) and (a2) in the porous material being bound via urea groups —NH—CO—NH—. Greater preference is given to from 50 to 100 mol % of the components (a1) to (a3) in the porous material being bound via urea groups, in particular from 60 to 100 mol %, very particularly preferably from 70 to 100 mol %, in particular from 80 to 100 mol %, for example from 90 to 100 mol %.

The balance to 100 mol % are present as further linkages, in particular as isocyanurate linkages. However, the further linkages can also be present in the form of other linkages of isocyanate polymers known to those skilled in the art. Mention may be made by way of example of ester, urea, biuret, allophanate, carbodiimide, isocyanurate, uretdione and/or urethane groups.

The determination of the mol % of the linkages of the monomer building blocks in the porous material is carried out by means of NMR (nuclear magnetic resonance) spectroscopy in the solid or in the swollen state. Suitable methods of determination are known to those skilled in the art.

The density of the organic porous materials which can be obtained by the process of the invention is usually from 20 to 600 g/l, preferably from 50 to 500 g/l and particularly preferably from 100 to 300 g/l.

The process of the invention gives a coherent porous material and not only a polymer powder or polymer particles. The three-dimensional shape of the resulting porous material is determined by the shape of the gel which is in turn determined by the shape of the gelling apparatus. Thus, for example, a cylindrical gelling container usually gives an approximately cylinder gel which is then dried to give a porous material in cylindrical form.

The porous materials of the invention and the porous materials which can be obtained by the process of the invention have a low thermal conductivity, a high porosity and a low density combined with a high mechanical stability. The porous materials also have a small average pore size. The combination of the abovementioned properties allows the porous materials to be used as insulation material in the field of thermal insulation, in particular for applications in the vacuum sector where a very low thickness of vacuum panels is preferred, for example in refrigeration appliances or in buildings. Preference is given to use in vacuum insulation panels, in particular as core material for vacuum insulation panels. In addition, preference is given to the use of the porous materials of the invention as insulation material.

In addition, the low thermal conductivity of the porous materials of the invention makes use at pressures of from 1 to 100 mbar, in particular from 10 mbar to 100 mbar, possible. The property profile of the porous materials of the invention opens up, in particular, applications in which a long life of the vacuum panels is desired and the panels also have a low thermal conductivity even after many years at a pressure increase of about 2 mbar per year, for example at a pressure of 100 mbar. The porous materials of the invention and the porous materials which can be obtained by the process of the invention have advantageous thermal properties and also advantageous materials properties such as simple processability and high mechanical stability, for example a low brittleness.

EXAMPLES

The determination of the pore volume in ml per g of sample and the average pore size of the materials was carried out by means of mercury porosimetry in accordance with DIN 66133 (1993) at room temperature. The average pore size is, for the purposes of the present invention, the average pore diameter. The determination of the volume-weighted average pore diameter is carried out mathematically from the pore size distribution determined in accordance with the abovementioned standard.

The porosity in the unit % by volume was calculated according to the formula $P=(V_i/(V_i+V_s))*100\%$ by volume, where P is the porosity, $V_i$ is the Hg intrusion volume in accordance with DIN 66133 in ml/g and $V_s$ is the specific volume in ml/g of the test specimen.

The density ρ of the porous material in the unit g/ml was calculated according to the formula $ρ=1/(V_i+V_s)$. As specific volume, the value $1/V_s=1.38$ g/ml was used. This value can be determined by He pycnometry.

The following compounds were used:

a1-1: oligomeric MDI (Lupranat® M200) having an NCO content of 30.9 g per 100 g in accordance with ASTM D-5155-96 A, a functionality in the region of three and a viscosity of 2100 mPa·s at 25° C. in accordance with DIN 53018.

a1-2: oligomeric MDI (Lupranat® M50) having an NCO content of 31.5 g per 100 g in accordance with ASTM D-5155-96 A, a functionality in the range from 2.8 to 2.9 and a viscosity of 550 mPa·s at 25° C. in accordance with DIN 53018.

a2-1: Tetraethyl-4,4'-diaminodiphenylmethane
a2-2: Tetraisopropyl-4,4'-diaminodiphenylmethane
a2-3: 3,3'-Diisopropyl-5,5'-dimethyl-4,4'-diaminodiphenylmethane
a2-4: 4,4'-Diaminodiphenylmethane Example 1

1.6 g of the compound a1-1 were dissolved with stirring in 10.5 g of acetone at 20° C. in a glass beaker. 1.6 g of tetraethyl-4,4'-diaminodiphenylmethane (a2-1) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had an average pore diameter of 4 μm. The porosity was 89% by volume with a corresponding density of 135 g/l.

Example 2

1.6 g of the compound a1-2 were dissolved with stirring in 10.5 g of acetone at 20° C. in a glass beaker. 1.6 g of 3,3'-diisopropyl-5,5'-dimethyl-4,4'-diaminodiphenylmethane (a2-3) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had a pore volume of 5.6 ml/g and an average pore diameter of 3 μm. The porosity was 89% by volume with a corresponding density of 155 g/l.

Example 3

1.4 g of the compound a1-1 were dissolved with stirring in 10.5 g of acetone at 20° C. in a glass beaker. 1.7 g of tetraisopropyl-4,4'-diaminodiphenylmethane (a2-2) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had a pore volume of 6.3 ml/g and an average pore diameter of 2 μm. The porosity was 85% by volume with a corresponding density of 143 g/l.

Example 4

1.4 g of the compound a1-2 were dissolved with stirring in 10.5 g of acetone at 20° C. in a glass beaker. 1.7 g of tetraisopropyl-4,4'-diaminodiphenylmethane (a2-2) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had a pore volume of 5.5 ml/g and an average pore diameter of 1.5 μm. The porosity was 85% by volume with a corresponding density of 160 g/l.

Example 5C 1.9 g of the compound a1-1 were dissolved with stirring in 10.5 g of acetone at 20° C. in a glass beaker. 1.3 g of 4,4'-diaminodiphenylmethane (a2-4) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had a pore volume of 5.1 ml/g and an average pore diameter of 2.9 μm. The porosity was 87% by volume with a corresponding density of 170 g/l.

Example 6C 2 g of the compound a1-2 were dissolved with stirring in 10.5 g of acetone at 20° C. in a glass beaker. 1.3 g of 4,4'-diaminodiphenylmethane (a2-4) were dissolved in 11 g of acetone in a second glass beaker. The two solutions from step (a) were mixed. This gave a clear, low-viscosity mixture. The mixture was allowed to stand at room temperature for 24 hours to effect curing. The gel was subsequently taken from the glass beaker and the liquid (acetone) was removed by drying at 20° C. for 7 days.

The material obtained had a pore volume of 3.1 ml/g and an average pore diameter of 1.5 μm. The porosity was 81% by volume with a corresponding density of 260 g/l.

The use of the substituted polyfunctional aromatic amines according to the invention leads to porous materials which, in particular, have a reduced density at a comparable porosity.

The invention claimed is:

1. A porous material comprising, in reacted form:

(a1) a polyfunctional isocyanate; and (a2) a polyfunctional substituted aromatic amine (a2-s) of formula (I):

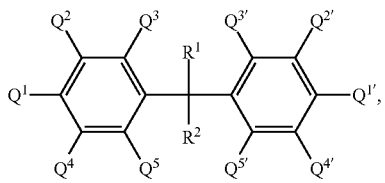 (I)

wherein:
R¹ and R² are each hydrogen; and
Q¹ and Q¹' are each a primary amino group;
Q³, Q³', Q⁵, Q⁵' are each hydrogen; and
Q², Q²', Q⁴ and Q⁴' are each independently a linear or branched alkyl group comprising from 1 to 12 carbon atoms, and
wherein the component (a2) optionally comprises a further polyfunctional amine which is different from the amine (a2-s) of formula (I) and is selected from the group consisting of a polyfunctional aliphatic amine (a2-a) and polyfunctional aromatic amine (a2-u),
wherein the polyfunctional aromatic amine (a2-u) is selected from the group consisting of isomers and derivatives of diaminodiphenylmethane and isomers and derivatives of toluenediamine,
wherein the polyfunctional aliphatic amine (a2-a) is a polyalkylenepolyamine,
wherein the porous material is in the form of a xerogel and has a volume-weighted average pore diameter of at least 1.4 μm and at most 4 μm,
wherein the porous material comprises, in reacted form, from 35 to 65% by weight of the isocyanate component (a1) and from 35 to 65% by weight of the amine component (a2), where a sum of the % by weight of the components (a1) and (a2) is 100% by weight,
wherein the porous material has a porosity of at least 85% by volume and a pore volume of 5.5 to 6.3 mL/g,
wherein the porous material has a density of 100 to 200 g/L, and
wherein the component (a1) is at least one polyfunctional isocyanate selected from the group consisting of diphenylmethane 4,4'-diisocyanate, diphenylmethane 2,4'-diisocyanate, diphenylmethane 2,2'-diisocyanate, and oligomeric diphenylmethane diisocyanate.

2. The porous material of claim 1, wherein the alkyl groups of the polyfunctional aromatic amine (a2-s) of formula (I) are selected from the group consisting of methyl, ethyl, n-propyl, isopropyl, n-butyl, sec-butyl, and tert-butyl.

3. The porous material of claim 1, wherein the polyfunctional aromatic amine (a2-u) is selected from the group consisting of a 4,4'-diaminodiphenylmethane, a 2,4'-diaminodiphenylmethane, a 2,2'-diaminodiphenylmethane, and an oligomeric diaminodiphenylmethane.

4. The porous material of claim 1, wherein the polyfunctional aromatic amine (a2-u) has a functionality of at least 2.1, and is an oligomeric diaminodiphenylmethane.

5. The porous material of claim 1, wherein the polyfunctional aromatic amine (a2-s) of formula (I) is a 3,3',5,5'-tetraethyl-4,4'-diaminodiphenylmethane.

6. A process for producing the porous material of claim 1, the process comprising:
(a) reacting the components (a1) and (a2) in the presence of a solvent (C), to form a gel; and then
(b) drying the gel, to obtain the porous material.

7. The process of claim 6, wherein the drying (b) is carried out by converting a liquid comprised in the gel into a gas at a temperature and a pressure below a critical temperature and a critical pressure of the liquid.

8. The process of claim 6, wherein the drying (b) is carried out under supercritical conditions.

9. A porous material, obtained by the process of claim 6.

10. A process for thermally insulating a material, the process comprising incorporating the porous material of claim 1 into an insulation material.

11. A process for thermally insulating a vacuum insulation panel, the process comprising:
incorporating the porous material of claim 1 into a vacuum insulation panel.

* * * * *